(12) United States Patent
van Eeden et al.

(10) Patent No.: US 12,329,120 B2
(45) Date of Patent: Jun. 17, 2025

(54) MILKING DEVICE WITH A MILK FILTER

(71) Applicant: LELY PATENT N.V., Maassluis (NL)

(72) Inventors: Bart van Eeden, Maassluis (NL); Malouk Maria Franck, Maassluis (NL); Gerard Mostert, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 38 days.

(21) Appl. No.: 18/023,122

(22) PCT Filed: Sep. 2, 2021

(86) PCT No.: PCT/IB2021/058020
§ 371 (c)(1),
(2) Date: Feb. 24, 2023

(87) PCT Pub. No.: WO2022/049517
PCT Pub. Date: Mar. 10, 2022

(65) Prior Publication Data
US 2023/0255174 A1 Aug. 17, 2023

(30) Foreign Application Priority Data

Sep. 3, 2020 (NL) .................................... 2026406
Jul. 28, 2021 (NL) .................................... 2028865

(51) Int. Cl.
*A01J 7/02* (2006.01)
*B01D 29/66* (2006.01)
(Continued)

(52) U.S. Cl.
CPC .............. *A01J 7/022* (2013.01); *B01D 29/66* (2013.01); *B01D 39/10* (2013.01); *B08B 3/04* (2013.01);
(Continued)

(58) Field of Classification Search
CPC ..... A01J 7/022; A01J 5/01; A01J 9/02; B01D 29/48; B01D 29/66; B01D 39/10
(Continued)

(56) References Cited

U.S. PATENT DOCUMENTS 4,061,504 A * 12/1977 Zall ......................... A01J 7/022
134/107
4,637,879 A * 1/1987 Hartley .................. B01D 35/30
210/450

(Continued)

FOREIGN PATENT DOCUMENTS

EP 1 221 282 A1 7/2002
EP 1 820 393 A2 8/2007
(Continued)

OTHER PUBLICATIONS

WO_2013081534 (Year: 2013).*
(Continued)

*Primary Examiner* — Morgan T Jordan
(74) *Attorney, Agent, or Firm* — Birch, Stewart, Kolasch & Birch, LLP (57) ABSTRACT

A milking device for milking a dairy animal is provided with milking mechanism, a control system, a milk pipeline for transporting the milk from the milking mechanism to a milk tank, a milk filter and a cleaning device. The cleaning device includes at least one cleaning fluid holder, a heating device for heating cleaning fluid in the cleaning fluid holder, an additive storage holder for additive, an additive adding device for controlled addition of the additive to cleaning fluid, and a valve system for regulating flows of cleaning fluid and additive through the milking device. The cleaning device is configured for carrying out a cleaning cycle of the milking device with a prerinse with cold or tepid water, a hot rinse with heated water and an acidic or basic additive, a postrinse, and at least between the hot rinse and the (Continued)

postrinse, a counterflow cleaning step by passing cleaning fluid in counterflow through the milk filter. Thus, a milking device is provided that can be cleaned automatically as a whole including the milk filter. In particular, because the counterflow cleansing takes place after the hot rinse step, there is better removal of dirt and milk residues that are softened thereby, in particular from the milk filter.

10 Claims, 3 Drawing Sheets

(51) Int. Cl.
  *B01D 39/10* (2006.01)
  *B08B 3/04* (2006.01)
  *B08B 9/032* (2006.01)
(52) U.S. Cl.
  CPC ...... *B08B 9/0321* (2013.01); *B01D 2201/085* (2013.01); *B01D 2201/165* (2013.01); *B08B 2203/007* (2013.01); *B08B 2209/032* (2013.01)
(58) Field of Classification Search
  USPC ............................................. 119/673, 14.08
  See application file for complete search history.

(56) References Cited

U.S. PATENT DOCUMENTS

| 7,473,323 | B2* | 1/2009 | van den Berg | A01J 7/022 |
| | | | | 134/22.13 |
| 2002/0119574 | A1 | 8/2002 | Berg | |
| 2010/0310711 | A1* | 12/2010 | Kendell | A23C 3/04 |
| | | | | 210/411 |
| 2013/0213304 | A1* | 8/2013 | Bosma | A01J 7/022 |
| | | | | 119/14.17 |
| 2017/0079234 | A1* | 3/2017 | Torgerson | A01J 7/025 |

FOREIGN PATENT DOCUMENTS

| NL | 1037403 C | 4/2011 | | |
| WO | 99/39569 A1 | 8/1999 | | |
| WO | WO 2012/067569 A1 | 5/2012 | | |
| WO | WO-2013081534 A1 * | 6/2013 | ............ | A01J 7/022 |

OTHER PUBLICATIONS

International Search Report, issued in PCT/IB2021/058020, dated Jan. 21, 2022.
Written Opinion of the International Searching Authority, issued in PCT/IB2021/058020, dated Jan. 21, 2022.

* cited by examiner

MILKING DEVICE WITH A MILK FILTER

The invention relates to a milking device for milking a dairy animal with teats, provided with milking means, a control system for the milking device, a milk pipeline for transporting the milk from the milking means to a milk tank, a milk filter for filtering the milk transported by the milk pipeline, and a cleaning device for cleaning the milking device, wherein the cleaning device comprises a valve system for regulating flows of cleaning fluid through the milking device.

The milking of dairy animals requires the milking device as a whole to be cleaned regularly, to prevent milk residues being deposited, and to prevent bacteria and the like from growing in the milk residues. For this purpose, it is known to clean milking devices, wherein first as much milk as possible is removed from the milking device. Then the milk residues, including among other things milk fats and milk proteins, are removed by means of hot water with acid or base. Finally rinsing is carried out with cold or tepid water, to remove residues of the acidic or basic cleaning fluid and to cool the milking device before subsequent use with dairy animals.

It is also necessary for the milked milk to be filtered before it goes to the milk tank. In this operation, dirt such as manure and bedding particles, hairs, but also cell clusters and flocs and the like are filtered out of the milk. After some time the filter will become too contaminated. It is therefore important to ensure that new milking operations can be continued with a clean filter.

Hitherto, filter sleeves were used, which were replaced at least three times daily or sooner if it was necessary because of decreased milk flow or the like. This is very labor-intensive, and consumes a relatively large amount of raw material for the filter sleeves.

Moreover, from NL-C-1037403, a milking device is known, with a stainless steel milk filter that can be cleaned with a counterflow cleansing. The filter is thus made ready again for further use without having to replace it. In this way, the labor-intensive replacement of the filter sleeves, as well as excessive consumption of raw materials, are already effectively prevented. The known milk filter seems only to be cleaned in counterflow rinsing. However, no further details about the cleaning are given.

One aim of the present device is to provide a milking device of the kind indicated in the introduction that has improved cleaning.

The invention achieves this aim with a milking device in accordance with claim 1, in particular a milking device for milking a dairy animal with teats, provided with milking means, a control system for the milking device, a milk pipeline for transporting the milk from the milking means to a milk tank, a milk filter for filtering the milk transported by the milk pipeline, and a cleaning device for cleaning the milking device, wherein the cleaning device comprises at least one cleaning fluid holder, a heating device for heating cleaning fluid in the cleaning fluid holder, an additive storage holder for additive, an additive adding device for controlled addition of the additive to cleaning fluid in the cleaning fluid holder, and a valve system for regulating flows of cleaning fluid and additive through the milking device, wherein the cleaning device is configured for carrying out a cleaning cycle of the milking device with a prerinse with cold or tepid water as cleaning fluid, a hot rinse with water heated by the heating device and an acidic or basic additive as cleaning fluid, a postrinse, and at least between the hot rinse and the postrinse, a counterflow cleaning step by passing cleaning fluid in counterflow through the milk filter.

The invention is based on the idea that, although it is simplest to clean the milk filter only in counterflow, because the particles arrive at the milk filter in the opposite direction, it is better to carry out this counterflow cleansing of the milk filter as a component of the complete (main) cleaning of the milking device. Moreover, the idea comprises that the counterflow cleansing should not be carried out at an arbitrary moment, such as in particular after the complete main cleaning of the milking device, but is best carried out after the hot rinse. The particles that then still adhere to the filter even after the first cleaning steps with inter alia the hot rinse appear to display decreased adherence to the filter display owing to this hot rinse. The particles are softened and owing to the high temperature the adhesion and/or the van der Waals force is reduced, so that the subsequent counterflow rinsing of the milk filter will have a better result than if carried out after the postrinse. The latter would, owing to the direction of the cold or tepid cleaning fluid, press the particles onto the filter again, and in addition cool them, so that the adhesion is reinforced again for two reasons.

In fact, it may even be advantageous if the milking device is provided with a bypass line round the milk filter, wherein the cleaning device is configured at least to lead the postrinse away round the milk filter via the bypass line. For this purpose, besides said bypass line, in particular appropriate valve devices, controllable by the control system, are provided.

Particular embodiments of the invention are described in the appended subclaims, as well as in the next part of the introduction in the description.

In some embodiments, the cleaning device is configured for carrying out an additional counterflow cleansing step of the milk filter prior to the prerinse. This step, which advantageously is carried out with cold or tepid water, already provides a significant mechanical cleaning of the milk filter, because the particles and substances that do not have much adhesion are already washed away by the fluid flowing in counterflow. This applies for example to hairs, straw or other bedding particles, coarse material or other dirt. Probably milk residues and substances therein such as milk fat and milk protein will be removed less well by the first counterflow rinsing.

A consequence of the first counterflow rinsing of the milk filter is that the subsequent cleaning will not only no longer need to (try to) loosen or otherwise remove these particles that have already been removed, but also that the resistance to flow through the milk filter, and therefore through the whole milking device, is noticeably improved. In its turn, this also has positive consequences for the cleaning quality of the next cleaning steps.

It is in principle possible to clean the whole milking device in the counterflow rinsing step. A disadvantage in some cases is, however, that then the whole length of the milking device must be spanned by the preceding step(s). Now, if the length of the pipelines of the milking device is for example 100 meters, it may suffice to fill the first 10 meters with rinsing water, then drive these 10 meters forwards with hot rinsing, and finally fill 10 meters again with cold postrinsing water, and force this through the whole milking device. It will be clear that, with a counterflow rinsing after the hot rinse, this requires that then first the prerinse and the hot rinse are forced completely through the milking device, and then the postrinse is forced through the milking device from the other direction. They both require much more fluid, although certainly with shorter pipelines it is certainly not excluded. Consequently, advantageous embodiments are characterized in that the cleaning device, for the purpose of the counterflow rinsing, comprises a water supply connection to a milk outlet side of the milk filter, as well as a discharge connection to the milk inlet side of the milk filter. The water supply connection is connected to a water supply, such as a water main or storage reservoir, and the discharge connection is connected to a discharge such as a sewer or a receiving tank. Both the water supply connection and the discharge connection are closable with a valve device operable by the control system, which form part of the valve system. The valve system is configured to keep said valve devices of the water supply connection and the discharge connection closed during the prerinse, the hot rinse and the postrinse, so that the fluid used in the respective steps can flow through the milk filter in the milk direction. The cleaning device is, moreover, configured to keep said valve devices open in the counterflow rinsing step or steps, as well as to supply water through the water supply connection and allow it to flow through the milk filter to the discharge connection. Thus, the rinsing water can flow quite effectively through substantially only the milk filter, to clean it in counterflow cleaning, without further affecting the milking device.

It is noted here that in the device known from NL-C-1037403 it is possible that the milk filter is cleaned in counterflow rinsing throughout the main cleaning, i.e. that perhaps each rinsing and cleaning step of the milking device is carried out on the milk filter in the counterflow direction, simply by allowing all fluids to flow via the bypass lines 7 and 8. In this case, however, all contaminants of the milk filter, which is where most of the contaminants collect, are led unnecessarily through the rest of the milking device. In contrast, according to the present invention, it is not necessary to carry out all steps in counterflow on the milk filter, and it is advantageous to carry out the (or each) counterflow cleansing step substantially only on the milk filter, wherein rinsing water is fed separately to the milk filter, and the cleaning water is led away substantially directly after rinsing through the milk filter.

The configuration of the milk filter is not particularly limited per se. However, in attractive embodiments the milk filter comprises a housing with a metal filter member with filter openings, said filter member being intended to be rinsed through with milked milk, the milk being filtered. The filter member comprises wire having a one-sided tapered cross-sectional profile and a frame provided in a multi-turn spiral or in a series of discrete rings or rods, the frame being arranged around the windings and/or the rings and/or the rods are spaced apart, whereby the plurality of filter openings is provided between the windings and/or the rings and/or the rods.
In this case the filter openings in the filter member together will form the whole passage for the milk through the milk filter, in other words there is no way for the milk to go round the filter openings. The advantage of a metal filter member is that it is then easy to choose that it has good resistance to the hot acidic or basic cleaning fluids, and is also compatible with foodstuffs (milk). Stainless steel is one example, but other metals or alloys are not excluded.

The frame keeps the windings, rings or rods at a mutual distance, for example by means of clamps or other spacers, if desired assisted by gravity. Preferably, the windings, the rings or the rods are fixedly connected to the frame, for example by means of a welding or other connection. The frame may for example comprise a series of mutually parallel support wires. In the case of the windings or the rings, they can for instance be provided parallel to the longitudinal direction of the filter member, advantageously distributed over a circumference thereof. In the case of the parallel bars, the frame may comprise a series of mutually parallel support rings, which hold the bars, which preferably extend parallel to the longitudinal direction of the filter member, together like staves of a barrel. Advantageously, the provided support wires or support rings of the frame extend perpendicularly thereto at the location of their connection to the windings or rings or the rods, respectively.

Note that the filter openings then effectively extend between adjacent windings, rings or rods on the one hand and adjacent support wires or support rings on the other. The filter openings are therefore rectangular, often quite elongated, to square in an extreme case, and at least each time as part of a cylinder surface. The smallest dimension is often the distance between the windings, rings or rods.

An advantage of such a filter shape is that it can be manufactured efficiently, with well-controllable tolerances. It is true, however, that precisely because of the often elongated filter openings there is a danger that elongated dirt particles, with a longest dimension that is much larger than a smallest dimension of the filter openings, nevertheless pass through the filter member. For example, a hair of a dairy animal, with a diameter of about 0.1 mm and a length of, e.g. a few centimeter, can still pass fairly easily through a filter opening, the smallest dimension of which is only marginally larger than 0.1 mm, but rather elongated, especially if the frame is mounted on the side with the greatest distance between the windings, rings or rods. After all, the length of the filter openings is then very large on the inflow side. It is advantageous if the smallest size of the filter openings, which in almost all practical cases corresponds to the distance between the windings, the rings or the rods, is clearly smaller than the smallest elongated dirt particles to be expected. In the case of a milk filter, these are the hairs, so that said smallest dimension is preferably at most, for example, 80 μm. Theoretically, it is possible to use a frame with very many support wires or support rings, thereby creating square holes, or even filter openings whose smallest dimension extends between said support wires or rings. However, this requires so much work for making the connections between frame and wire, and costs relatively so much through-flow area of the filter member, that this will be no more than theoretical. Note that in the case of a plate with holes, this problem will occur much less or not at all, because in practice the holes will often be round.

According to the invention, the wire has a unilaterally tapered cross-sectional profile. This means that the filter openings in one direction through the filter member become smaller each time, and become larger each time in the opposite direction. This is advantageous in order to combine a good filter effect with good cleanability by means of winding cleaning. Note that the filter openings will often be elongated (see above) and will have a smallest dimension, which is then measured between the adjacent windings, rings or rods. In the case of a tapered cross-sectional profile of the wire, it is this dimension, which itself increases in the direction of the tapered portion of the wire, so that the through-flow opening becomes larger. It may be useful to face the filter openings with their smallest dimension towards the dirty side, i.e. towards the inflow side of milk, and thus with their largest dimension towards the outflow side. As a result, impurities in the milk to be filtered can be retained by the filter member, but will not get stuck in narrowing filter openings. When cleaning liquid subsequently passes through the filter member in counterflow, it will be better able to remove the impurities present on the filter surface due to the filter openings that do become narrower in the counterflow direction, because the flow speed and possibly the turbulence intensity will increase when the filter openings become narrower. Moreover, with the dimensions of the filter opening remaining the same or even decreasing, dirt particles could become lodged in that filter opening, certainly when they are approximately the same size as the size of the filter opening. After all, when turned, the dirt particle could be just too wide, or could encounter a narrowing in the filter opening, such as from older, adhered dirt or an irregularity in the surface of the filter opening. This danger of dirt particles becoming trapped is much smaller if the (internal) size of the filter opening increases in the direction of the milk flow. The milk flow direction is here either from the first volume part to the second volume part, or vice versa. Therefore, the cross-sectional profile of the wire with a widest side will face the first volume part or second volume part, respectively.

In practice, the dimensions of the filter openings will largely be determined by the properties of the milk. An example of a useful smallest dimension is between about 50 μm and 100 μm, such as between 60 and 80 μm. The dimension increases towards the other side, to for instance between 120 and 160 μm or more. Of course, other dimensions are also possible, and reference is made to the aforementioned caveat with regard to elongated iniquities. In practice, the smallest distance can be determined based on the estimated or measured maximum size of the fat globules which should preferably flow unhindered through the milk filter. These are often between 1 and 30 μm in diameter. It is emphasized again that the "smallest dimension" does not refer to the length of the filter openings, which in practice may be much greater than the distance between the windings, rings or rods.

The cross-sectional profile of the wire preferably comprises a triangular shape and is further preferably triangular. This provides sufficient rigidity and well-calculable flow properties to the filter member. Nevertheless, other profile shapes such as hemispherical, semi-elliptical or the like are also possible. The taper of the cross-sectional profile is advantageously from a flat end, i.e. actually one side of the wire, to a narrower, pointed or rounded end, i.e. actually an opposite side of the wire.

The frame may be attached to the narrower side of the wire and/or to the flat side of the wire. It has some advantages if the frame is attached to (only) the narrower side of the wire. For instance, the flow through the filter member will be less influenced by the frame, because the size of the filter opening towards the frame then increases. It is also relatively easy to make connections to the wire using resistance welding, precisely because the resistance between the frame and a narrow side is greater.

There is in principle no restriction on selection of the number of filter openings can in principle be freely selected. The more filter openings, the less resistance the filter will present in the milk stream or cleaning fluid stream. For example, the milk filter comprises approx. a thousand filter openings.

The form of the filter member is not especially limited, and may for example be a flat filter positioned transversely to the direction of flow of the milk. Advantageously, however, the filter member comprises a cylindrical filter. Then the milk may either flow centrally in the filter member, then flow via the filter openings to the outer side of the cylindrical plate, and then flow out of the housing, or in the opposite order. In the first case, the contaminants are largely trapped within the cylindrical filter, and in the second case just on the outer side. This last possibility has the advantage that the stream of cleaning fluid can attain a higher velocity more easily. In addition, it allows the filter to be inspected optically.

In a next aspect, the invention also relates to a method in accordance with claim 4, for cleaning a milking device according to the aforementioned aspect of the invention, in particular a method for cleaning a milking device as claimed in one of the preceding claims, comprising the following steps in order: prerinsing of the milking device with cold or tepid water as cleaning fluid, hot rinsing of the milking device with water heated by the heating device and an acidic or basic additive as cleaning fluid, postrinsing of the milking device with cold or tepid water as cleaning fluid, and at least between the hot rinse and the postrinse, cleaning of the milk filter by passing cleaning fluid in counterflow through the milk filter.

The advantage of this method already follows from the above description for the milking device, so that many details may be omitted to avoid unnecessary repetition. It is sufficient to state here that particles on and in the milk filter that are softened by the hot rinse can be removed effectively by the next counterflow rinsing.

Advantageous embodiments are once again described in the appended subclaims, as well as in the next part of the introduction in the description.

In particular, in the counterflow rinsing step substantially only the milk filter is rinsed, i.e. not the rest of the milking device. For this purpose, for example a separate water supply to the milk filter is provided, as well as a discharge to a sewer or the like, as well as valve devices for shutting off the other (milk) connections. Then by allowing rinsing water to flow via the water supply through the milk filter to the discharge, only the milk filter is cleaned in counterflow rinsing. Nevertheless, it is also possible to carry out the counterflow rinsing step on the whole milking device, i.e. on the milk-transporting parts thereof. Admittedly, this requires an extra step, wherein the milking device is first to be stripped of the hot cleaning fluid completely, but in fact the postrinsing step may thus be combined with the counterflow rinsing step, by carrying out the former in the counterflow direction.

In some embodiments, the milk filter is rinsed with rinsing water in the counterflow direction prior to the prerinsing step. This already removes many contaminants, which can no longer hamper the cleaning in the subsequent steps. Now the cleaning fluid forces the remaining dirt in all subsequent steps more firmly against or in the milk filter, which is undesirable per se.

In addition, further steps may be provided in the method, such as a blowing step, wherein the milk still present in the milking device after milking is conveyed as much as possible by air to the milk tank, thereby also stripping the milking device of milk as far as possible, prior to the actual cleaning. Moreover, said blowing step may also be carried out after the postrinsing step, to blow postrinse water out of the milking device. Moreover, finally a drying step may be carried out, either by waiting for a predetermined time, or for example by blowing heated air through the milking device. However, all these steps are known per se, so that a person skilled in the art is easily able to carry these out, and consequently further discussion is not included here.

The invention will now be explained in more detail based on some nonlimiting embodiment examples, as well as the drawing, in which.

Figure 1:
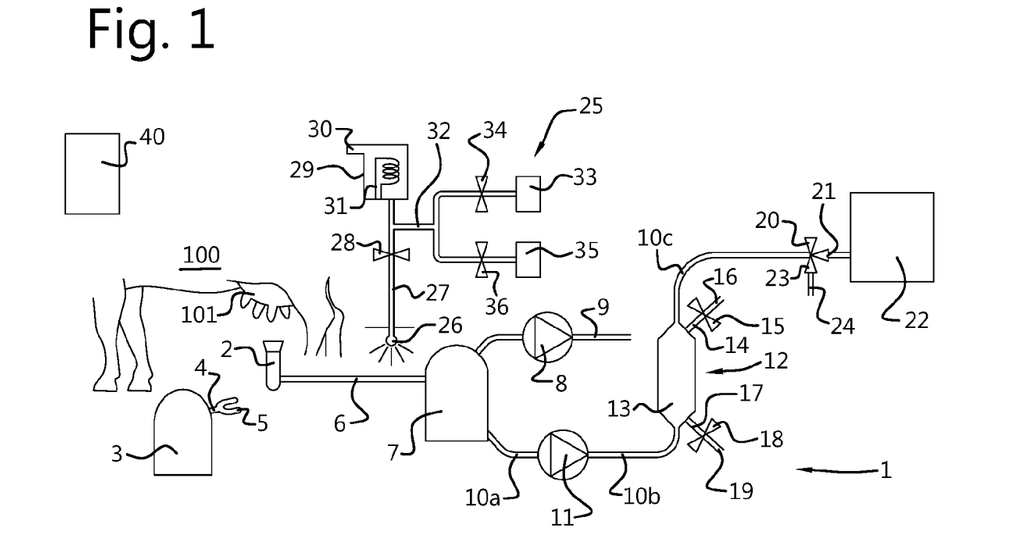
FIG. 1 shows a schematic view of a milking device according to the invention.

FIG. 1 shows a schematic view of a milking device according to the invention. The milking device is indicated generally with the reference number 1, and comprises one or more milking cups 2, and optionally a milking robot 3 with a robot arm 4 and a gripper 5. The milking cup 2 is connected via a milk hose 6 to a milk glass 7, which is vacuumed to a connection to atmosphere 9 by a vacuum pump 8.

A milk pipeline has a first, second and third milk pipeline part 10a, 10b and 10c, respectively, via which a milk pump 11 pumps milk away through a milk filter 12. The milk filter comprises a housing 13, as well as a water supply line 14 that is closable with a first valve 15 and is connected to a water main 16, and a water discharge line 17 that is closable with a second valve 18 and is connected to a sewer 19.

Via the third milk pipeline part 10c, milk goes through a three-way valve 20 with a first transfer line 21 to a milk tank 22, and for example cleaning fluid via a second transfer line 23 to a sewer 24.

A cleaning device is indicated with 25, with a spray head 26, which via a supply line 27, which is closable with a third valve 28, receives fluid supplied from a holder 29, which is replenishable from a water main connection 30, and heatable with a heat source 31. Via an additive line 21, additives are suppliable from a first additive holder 33, controllable with a first additive valve 34, and/or from a second additive holder 35, controllable with a second additive valve 36. A control system for the milking device 1 is indicated with 40. Finally, a dairy animal, with teats 101, is indicated with 100.

The milking device 1 is shown here as a robot milking device, with a robot 2 with a robot arm 3 with a gripper 4, which is able to place the milking cup 2 on a teat 101 of a dairy animal 100. For this, components that are known per se are provided, such as a teat recognizing device, but for clarity these are not shown here, since they do not form part of the invention. In fact, the present invention is also applicable to conventional milking devices, wherein the milking cup 2 is connected to a teat 101 by hand.

In the milking device 1, as is known per se, milk is obtained in that a vacuum is exerted on the teat 101 via the vacuum pump 8, the milk glass 7, the milk hose 6 and the milking cup 2. The milk from milking of this teat 101, and any other teats present, such as four in total in the case of a cow, is collected in the milk glass 7. From there, the milk pump 11 can pump the milk away via the milk pipeline 10, here shown in parts 10a, 10b and 10c, to the milk tank 22.

Prior to storage in the milk tank 22, the milk has to be filtered, which takes place in the milk filter 12. The milk filter 12, the details of which will be explained further, comprises a housing 13, in the form of a cylinder of transparent or other material, with an upper end and a lower end, and inside, a filter member with filter openings. Moreover, there is a water supply line 14 for cleaning fluid, and a water discharge line 17. With the former, cleaning fluid, such as plain water via water main 16 or water with additions, can be fed in counterflow to the filter, and after rinsing through the milk filter can be led away again via the latter, to a sewer 19 or a receiving tank, for example for reuse. Both the supply line and the discharge line may be closed or opened with a first valve 15 or a second valve 18, respectively.

Moreover, a cleaning device 25 is provided, which provides the cleaning of the milking device 1 as a whole. It should be noted here that the whole milking device 1, including the cleaning device 25, milk filter 8 and all valves 15, 18, 20, 28, 34 and 36 are controlled by the control system 40, which is connected in any way, wireless or wired, actively with these components. Said valves may be included together as a valve system for conveying cleaning fluid through the milking device 1.

For example, for cleaning, a milking cup 2 is connected to the spray head 26 by means of the robot arm or by an operator. This brings cleaning fluid in, for example by spraying it, although other methods are also possible. The cleaning fluid is supplied via the supply line 27, which is closable with the third valve 28, from a storage reservoir 29. This contains for example water, and may be replenished from a water main 30, such as with a float or the like. The storage reservoir 29 has a heat source, such as a heating coil, for heating the fluid in the holder. For example, water may be heated to a temperature of 85 to 95 degrees Celsius, or any other desired temperature. If required, an additive may be supplied to the water, via the additive line 32. This is connectable by means of the first additive valve 34 to the first additive holder 33 with for example an acid, or via a second additive valve 36 or a second additive holder 35, with for example an alkaline solution. Thus, various cleaning fluids are available for cleaning the milking device 1, namely (mains) water, water with an acid or water with a base, in each case whether heated or not.

Figure 2:
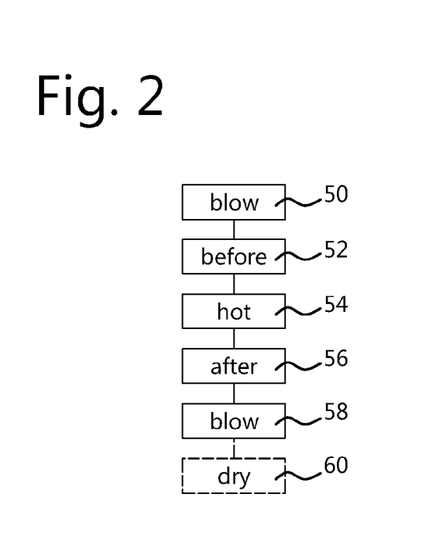
FIG. 2 shows a flow diagram for a cleaning operation according to the prior art.

The various fluids may be used in the cleaning of the milking device 1, once again as known per se in the prior art, and shown in FIG. 2. For example, a known cleaning procedure comprises the following steps:

50: blowing-through the milk conveying parts (incl. milking cup 2, milk hose 6, milk glass 7, milk pipeline parts 10a, 10b, 10c, milk filter 12), to move as much milk as possible to the milk tank 22, and remove it from the milk conveying parts;

52: prerinsing with tepid water, in order to wash away as much milk residue as possible, and any dirt or other extraneous matter, from the milk conveying parts;

54: hot rinsing with hot water with additive (for example an acid against lime or milkstone, or a basic solution against milk fat and milk proteins) advantageously at least at 77° C., for removing in particular the respective aforementioned milk constituents, and as much other dirt or extraneous matter as possible that ends up in the milking device, such as hairs, sand, cloth, insects and so on.

56: a postrinse with tepid or cold water, to wash away residues of the cleaning fluid, and to cool down the milk conveying parts, in order to prevent injury to the next dairy animal and to prevent precipitation of milk proteins;

58: blowing-through the milk conveying parts, to blow away as much water as possible, which should not end up in the milk; and optionally

60: drying the milking device, so that any remaining water evaporates.

Note that alternative steps or means, as well as additional steps may be employed, such as an additional last step with a "sanitizer" in the United States.

Now, in the known milking devices the milk filter often contains a filter sleeve, said filter sleeve being replaced with a new one prior to a cleaning operation. Now, a milk filter collects dirt and other extraneous matter, and may get increasingly clogged. However, attempts to rinse such a filter clean with the cleaning steps for the milking device have had limited success. Thus, there will be little or no removal of sand, and to a lesser extent straw, hairs and the like. Therefore, the filter sleeve is replaced first.

Similar considerations also apply to the milking device according to the present invention, but it has an automatically cleanable milk filter, which in principle does not need to be replaced, or cleaned manually. This is achieved as follows, referring to FIG. 1, FIG. 3 and FIG. 4.

Figure 4:
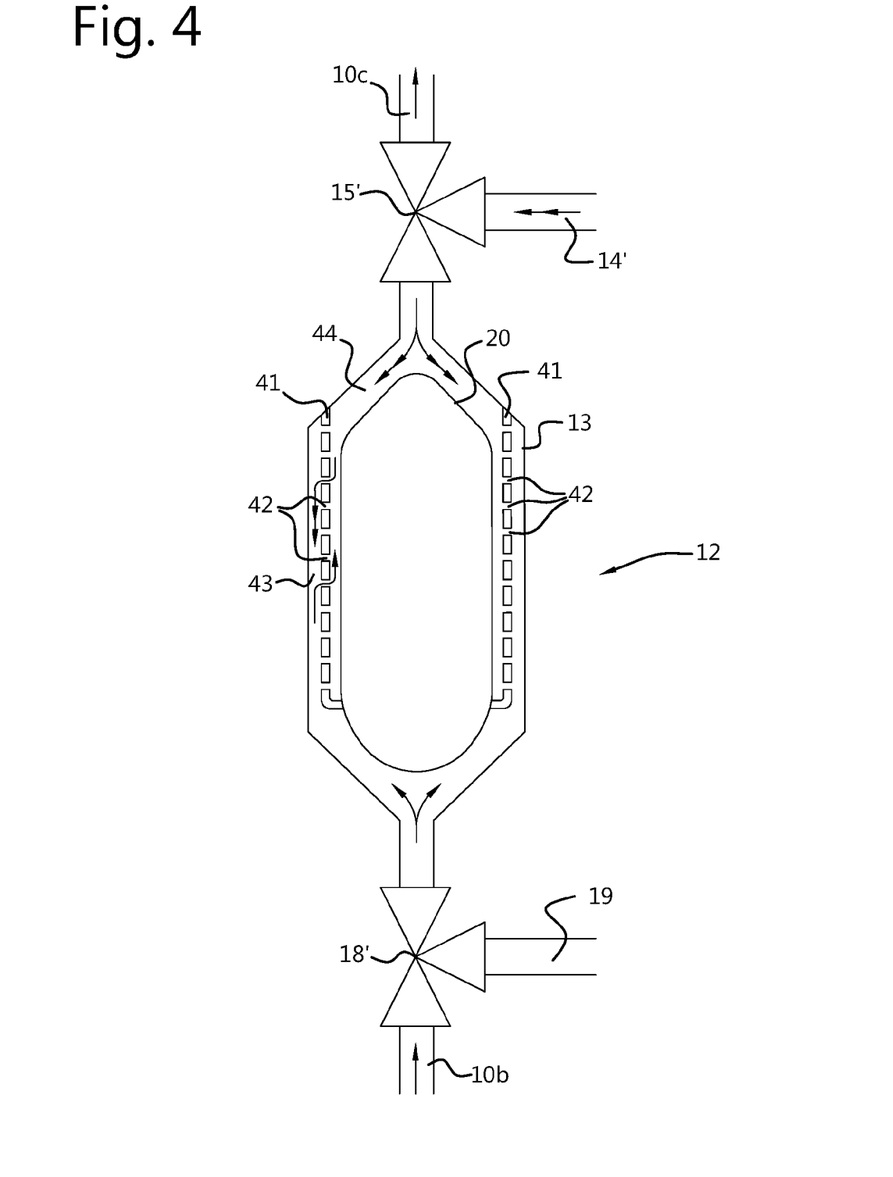
FIG. 4 shows in more detail a milk filter according to FIG. 1.

FIG. 4 shows a schematic representation of the milk filter 12 of the milking device according to FIG. 1. Similar components are indicated with the same reference numbers, provided with a prime if necessary.

The housing 13 contains a filter member 41 with filter openings 42, and divides the interior of the milk filter 12 into a first partial volume 43 and a second partial volume 44. Moreover, the first valve 15' and the second valve 18' are now both three-way valves. The direction of the milk during pumping of the milk is indicated with single arrows, and the direction of the cleaning fluid with double arrows.

The housing is generally cylindrical, for reasons of symmetry and cleaning, and may be made of glass or some other transparent material to allow visual assessment of the milk filter from outside. Of course, metals, plastics and other non-transparent materials are also possible. The housing accommodates the filter member 41, which is also generally cylindrical, and concentric with the housing. The filter member is advantageously a tubular metal member, and is provided with filter openings to allow the milk to pass through. The size of the filter openings is adapted to the dimensions of the fat globules, which must be allowed to pass through and mostly have a cross section of 1 to 30 µm, and is consequently for example about 80 µm. Preferably the filter member 41 has very many filter openings 42, so as to present minimum resistance to flow of the milk. For example, about a thousand filter openings are provided.

The milk comes in from the second milk pipeline part 15b, and proceeds via the first partial volume 43, the filter openings 42 and the second partial volume 44 through the third milk pipeline part 10c to the milk tank, which is not shown. Any dirt remains behind on the filter member 41. During cleaning of the milk filter 12 in a counterflow cleansing step, cleaning fluid, such as water, is led from the water supply line 14' through the milk filter 12 in a counterflow direction, thus, in this case, from the second partial volume 44 through the filter openings 42 to the first partial volume 43, and then via the three-way valve 18' to the water discharge line 19, via which the water together with any dirt is led away, for example to a sewer. Other items that are known per se, such as a pump or other pressurizing means for keeping the cleaning fluid under pressure, or an air injector for supplying air to the cleaning fluid are known per se, and because they do not relate to the invention they are not mentioned further here.

An important difference between the milking device 1 according to the present invention and the known milking device with filter-sleeve milk filter is that the latter cannot be cleaned automatically, except by (automatically) replacing the filter sleeve, which leads to unnecessary consumption of materials. In contrast, in the present invention the milk filter is cleaned by, among other things, one or more counterflow cleansing steps. These are possible through the provision of supply and discharge of cleaning fluid, in the form of water supply line 14' and water discharge line 19. It is necessary to ensure that the supply and discharge of cleaning fluid occurs in a direction that is opposite to the direction of the milk through the milk filter 12. In addition, the milk filter 12 advantageously comprises a filter member 41 with filter openings 42, more advantageously a metal filter member, which filters the milk. Accordingly, in the invention it is certainly possible for the milk filter 12 to be cleaned automatically, inter alia by the counterflow rinsing step (or steps). As a result, dirt that is retained by the filter is washed away from the filter again. With the filter sleeve in the prior art, this is not, or at least not reliably, possible. This is because a filter sleeve is a fabric, in which the dirt is trapped, even in counterflow rinsing.

Figure 3:
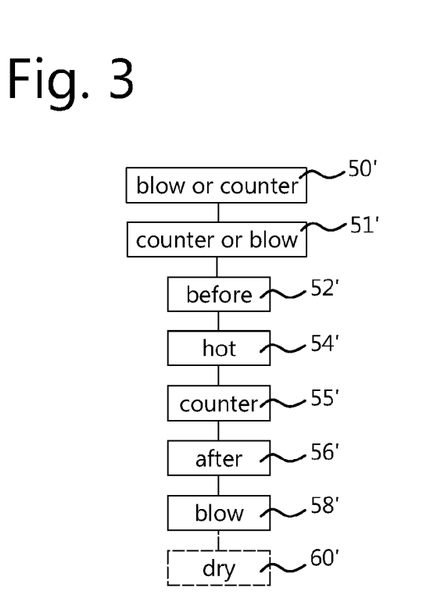
FIG. 3 shows a flow diagram for a cleaning method according to the invention.

The whole cleaning method according to the invention is illustrated in FIG. 3. This comprises, as is usual and consequently is not explained in more detail, a step for blowing milk out of the milk conveying parts. A counterflow cleansing step of the milk filter 12 may also be carried out, either before the blowing step, or directly thereafter. The first variant has the advantage that the flow resistance through the milk filter, and thus through the whole milking device, will be lower, and that already a lot of dirt will be removed from the milk filter 12, which can be beneficial for the quality of the milk that has yet to be blown away, the second version has the advantage that no water or other cleaning fluid ends up in the milk or alternatively that no additional measures such as blowing dry need to be taken to prevent water getting into the milk. FIG. 4 shows the optional sequence of counterflow cleansing step and blowing step, showing both options in a different order before steps 50' and 51'.

Thus, dirt is removed from the milk filter by the counterflow rinsing step. To prevent the dirt being transported through the rest of the milking device, the discharge line 19 is provided, so that the dirt washed away can leave the milk filter directly. For this purpose, yet another valve is provided, which closes the transfer from the milk filter 12 to the milk pipeline part 10b; this valve is not shown here, and may for example be combined with valve 18.

The milk filter 12, from which a large part of the filtered dirt has thus already been removed, either before or after the blowing step, often has a much lower flow resistance, so that the whole milking device 1 can then be cleaned in the usual way, described above. The milk filter 12 will then also be rinsed through with the steps prerinse 52', hot rinse 54' and postrinse 56'. Because these do not differ otherwise from the known steps, there is no further discussion here.

According to the present invention, the most important step is that directly after the hot rinse 54', a counterflow-rinse cleaning step 55' of the milk filter 12 is carried out. In this step, fluid, in particular tepid or cold water, is passed in counterflow through the milk filter 12. This provides some advantages, namely that dirt left behind in the milk filter, and in particular milk constituents that have already been softened by the hot rinse step 54', are now released relatively more easily and can be washed away. Moreover, cooling of the milk filter has already started. It should be emphasized that it is unfavorable to wait for the counterflow rinsing step 55' until after the postrinse step 56', because then the softening effect of the hot rinse step will be lost.

Furthermore, it is noted here that it is possible to carry out the counterflow cleansing step 55' on the whole milking device instead of only on the milk filter. It is true that in fact the cleaning fluid must then pass through the whole milking device. On the other hand, it is certainly possible to carry out the postrinse step in counterflow, so that in fact steps 55' and 56' are combined into one.

Finally, there are once again the blowing step 58' and the optional drying step 60'. These are once again known per se, and will not be discussed further.

Figure 5:
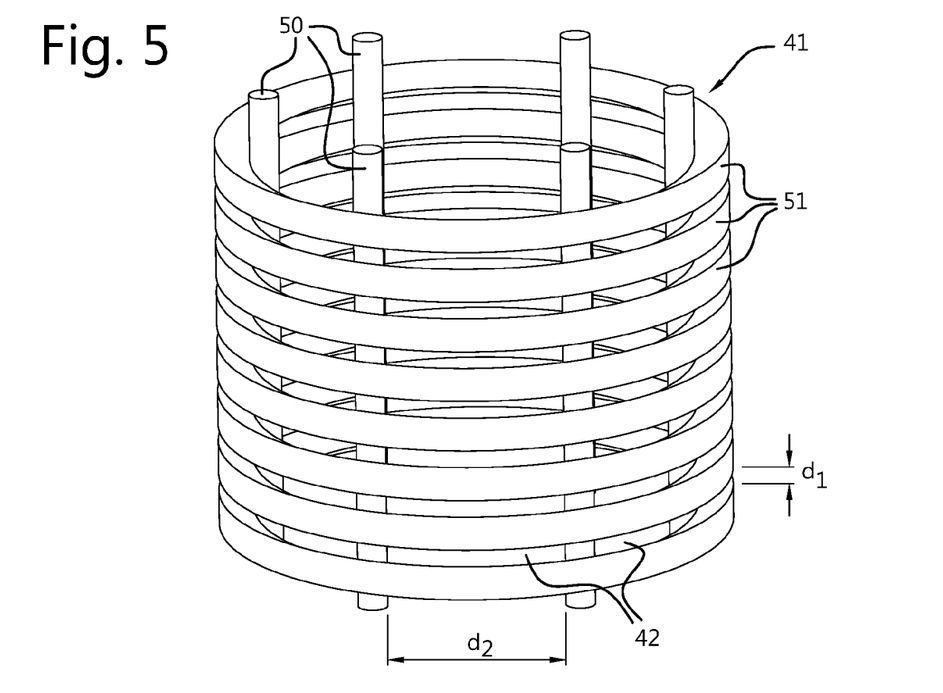
FIG. 5 shows a schematic perspective view of a filter member.
Figure 6:
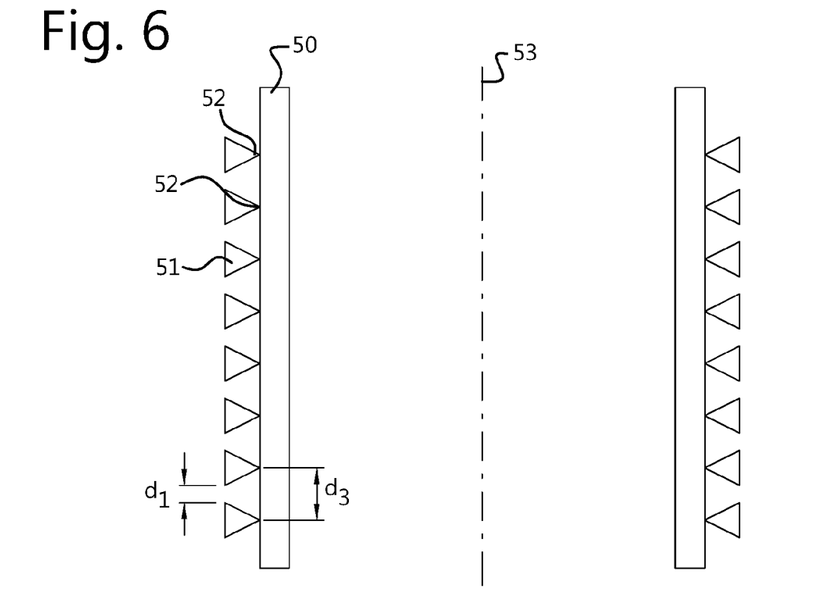
FIG. 6 shows a schematic cross sectional view of the filter member of FIG. 5.

FIG. 5 shows a schematic perspective cross-sectional view of a filter member 41. It comprises a frame of support wires 50, with rings 51 therearound, and the filter openings 42 therebetween. FIG. 6 shows a schematic cross-sectional view of the filter member of FIG. 5, along the plane that stretches through the most left support wire, and the most right support wire 50. Connection points are indicated by 52, and by 53 the longitudinal direction of the filter part 41.

The filter portion 41 shown here consists, for simplicity, of eight rings 51 around a frame of six support wires 50, and thus forty-two openings 42 are provided. In practice, in view of the often desired dimensions of the filter openings 42, many more such openings will be provided, and correspondingly more support wires 50 and/or rings 51. Furthermore, for the manufacturability of the filter member 41 it is often easier not to have separate rings 51, but one long wire wound around the support wires 50 in coils. Finally, it is also possible to reverse the function of the support wires 50 and the rings 51. In this case, this means that the very six vertical elements or bars 50 will have a tapered cross-sectional profile, and will be held together by the rings 51. Of course the respective numbers will be quite different, such as 60 bars and (for the proportions shown) three or four rings 51. For the further explanation, this will make no difference.

The rings, or wire or windings or coils 51 have a tapered, e.g., triangular cross-section. In the example, the widest side of the rings 51 is located on the outside of the filter part 41. This is suitable for allowing milk to flow from the outside in through the filter part 41 and filter it, so that cleaning liquid flows in the counterflow direction, i.e. from the inside to the outside, will be able to effectively loosen and entrain the filtered dirt. In order to disturb the flow of the milk and the cleaning liquid, respectively, as little as possible, the support wires 50 are located on the inside of the rings 51. However, it is also possible to fix support wires 50 on the outside. It is furthermore possible to arrange the wire/windings precisely with the thinnest side outwards, in particular if the milk has to flow from the inside to the outside through the filter element.

The filter openings 42 have a width d1 and a length d2. In practice, the width d1 will be relatively smaller than the width d2, for instance one or more orders of magnitude. For milk filters, a suitable width is, for example, between 50 and 90 μm, such as 60-80 μm. The length can be, for example, 5 or 10 mm, or even more. Since at such lengths hairs of dairy animals could slip through parallel to the opening 42, it is important to choose the width d1 not much greater than the thickness of a hair. A bovine hair has a thickness of about 60 μm, but will almost never be completely straight. A width d1 will then preferably not be much more than 60 μm, such as for instance between 60 and 80 μm.

The cross section shown in FIG. 6 shows the tapered cross-sectional profile of the wire, i.e. the rings 51. The profile here is triangular, with the largest side outside, and the thinnest side on the inside of the filter member 41. At that thinnest side, the rings having a point of attachment 52 attached to the support wires 50, such as with a resistance weld such as a spot-weld. It is noted that the cross-sectional profile can also be less tapered or sharp, and for instance rounded, semi-elliptical, semicircular, or even frustoconical. There is then still the advantage of filter openings that widen in the milk flow direction, but there are other options for attaching the wire to the frame.

On the (straight) outer side, the width of the opening is d1, while it increases to d3 towards the thin side. Where d1 is determined by the wishes with regard to material to be filtered out, the width d3 is not limited by those. Rather, it is determined by the width of the rings 51, and the degree of taper of the cross-sectional profile. It may be advantageous to take a relatively gradually tapered profile, i.e. a fairly flat wire, so that d3 is not very much smaller than d1. For example, d3 is between 120 and 160 μm.

The invention claimed is:

1. A milking device for milking a dairy animal with teats, comprising:
    a control system for the milking device;
    a milk pipeline for transporting the milk to a milk tank;
    a milk filter for filtering the milk transported by the milk pipeline; and
    a cleaning device for cleaning the milking device,
    wherein the cleaning device comprises:
        at least one cleaning fluid holder;
        a heating device for heating cleaning fluid in the cleaning fluid holder;
        an additive storage holder for additive;
        an additive adding device for controlled addition of the additive to cleaning fluid in the cleaning fluid holder; and
        a valve system for regulating flows of cleaning fluid and additive through the milking device,
    wherein the control system is configured to cause the cleaning device to carry out a cleaning cycle of the milking device with:
        a prerinse with cold or tepid water as cleaning fluid;
        a hot rinse with water heated by the heating device and an acidic or basic additive as cleaning fluid;
        a postrinse; and
        at least between the hot rinse and the postrinse, a counterflow cleaning step by passing cleaning fluid in counterflow through the milk filter.

2. The milking device as claimed in claim 1, wherein the cleaning device is configured for carrying out an additional counterflow cleansing step of the milk filter prior to the prerinse.

3. The milking device as claimed in claim 1, wherein the milk filter comprises a housing, inside which there is a metal filter member with a plurality of filter openings, said filter member being intended to have milked milk passed through and thus filter the milk, wherein the filter member comprises wire having a one-sided tapered cross-sectional profile and a frame provided in a multi-turn spiral or in a series of discrete rings or rods, the frame being arranged to hold the coils or the rings or the rods on a spacing, thereby providing the plurality of filter openings between the coils or the rings or the rods.

4. A method for cleaning the milking device as claimed in claim 1, comprising the following steps in this order:
    prerinsing of the milking device with cold or tepid water as cleaning fluid;
    hot rinsing of the milking device with water heated by the heating device and an acidic or basic additive as cleaning fluid;
    postrinsing of the milking device with cold or tepid water as cleaning fluid; and
    counterflow rinsing of the milk filter by passing cleaning fluid in counterflow through the milk filter, at least between the hot rinse and the postrinse.

5. The method as claimed in claim 4, wherein in the counterflow rinsing step substantially only the milk filter is rinsed.

6. The method as claimed in claim 5, wherein the counterflow rinsing step of the milk filter is also carried out prior to the prerinsing step.

7. The method as claimed in claim 4, wherein the counterflow rinsing step of the milk filter is also carried out prior to the prerinsing step.

8. The milking device as claimed in claim 2, wherein the milk filter comprises a housing, inside which there is a metal filter member with a plurality of filter openings, said filter member being intended to have milked milk passed through and thus filter the milk, wherein the filter member comprises wire having a one-sided tapered cross-sectional profile and a frame provided in a multi-turn spiral or in a series of discrete rings or rods, the frame being arranged to hold the coils or the rings or the rods on a spacing, thereby providing the plurality of filter openings between the coils or the rings or the rods.

9. A method for cleaning the milking device as claimed in claim 2, comprising the following steps in this order:

prerinsing of the milking device with cold or tepid water as cleaning fluid;

hot rinsing of the milking device with water heated by the heating device and an acidic or basic additive as cleaning fluid;

postrinsing of the milking device with cold or tepid water as cleaning fluid; and counterflow rinsing of the milk filter by passing cleaning fluid in counterflow through the milk filter, at least between the hot rinse and the postrinse.

10. A method for cleaning a milking device as claimed in claim 3, comprising the following steps in this order:

prerinsing of the milking device with cold or tepid water as cleaning fluid;

hot rinsing of the milking device with water heated by the heating device and an acidic or basic additive as cleaning fluid;

postrinsing of the milking device with cold or tepid water as cleaning fluid; and counterflow rinsing of the milk filter by passing cleaning fluid in counterflow through the milk filter, at least between the hot rinse and the postrinse.

* * * * *